United States Patent

[11] 3,625,761

| [72] | Inventor | Jack F. Tate |
| | | Houston, Tex. |
| [21] | Appl. No. | 887,721 |
| [22] | Filed | Dec. 23, 1969 |
| [45] | Patented | Dec. 7, 1971 |
| [73] | Assignee | Texaco Inc. |
| | | New York, N.Y. |

[54] METHOD FOR THE TREATMENT OF ALKALINE EARTH METAL SULFATE SCALE
3 Claims, No Drawings

[52] U.S. Cl. .................................................. 134/3,
134/10, 134/13, 134/22 R, 166/300, 252/86
[51] Int. Cl. ......................................................... C23g 1/08,
C23g 1/20

[50] Field of Search............................................ 134/3, 10,
13; 210/54, 58; 166/300

[56] References Cited
UNITED STATES PATENTS
| 2,774,694 | 12/1956 | Wiggins........................ | 134/13 |
| 3,033,214 | 5/1962 | Bersworth.................... | 134/13 |

*Primary Examiner*—Morris O. Wolk
*Assistant Examiner*—Sidney Marantz
*Attorneys*—Thomas H. Whaley, Carl G. Ries and James F. Young

ABSTRACT: Method for the treatment of alkaline earth metal sulfate scale using sodium ethylenediaminetetraacetate and recovery of the sodium ethylenediaminetetraacetate.

METHOD FOR THE TREATMENT OF ALKALINE EARTH METAL SULFATE SCALE

This invention relates to a composition useful in treating oil and gas wells and to a method of using such composition for such treatment. More particularly, this invention is directed to a composition and method useful in the removal of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the removal of built-up of scale deposits in aqueous systems susceptible to mineral scale formation.

The formation of objectionable scale deposits, such as calcium, strontium or barium sulfate is rather widespread in certain producing areas, and has been attributed to several causes. One generally accepted theory of scale formation is that of chemical precipitation resulting from the commingling of two fluid streams each of which contains a concentration of particular ion such that when they commingle an unstable aqueous system is produced. For example, in the case of calcium sulfate scale formation, one stream contains sulfate ions, and the other calcium ions in such concentration so as to produce an unstable aqueous system. The mixing of these streams at the well bore or in flow lines may result in the deposition of a crystalline calcium sulfate deposit which gradually builds up on the walls of the well tubing or flow lines for example, to a point where it may choke off fluid flow in the well tubing or flow lines if remedial measures are not undertaken.

Another cause of the scale formation is attributed to the precipitation of scale material from potentially supersaturated solutions thereof. When the operating variables of temperature and pressure change adversely, thus reducing the solubility of the salt in solution, or solvent is allowed to evaporate thus concentrating the solution, precipitation of the salt on the well tubing, flow lines and even in the surrounding strata occurs.

The use of strong alkali solutions for the removal of alkaline earth metal sulfate scale has been proposed. It has been claimed that under certain favorable conditions of temperature and time, concentrated alkali solutions will in some cases provide a breakup of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive and in some cases, either undesirable or mechanically impossible.

It is known that the chemical compound sold under the trade name "Versene," disodium dihydrogen ethylenediaminetetraacetate hereinafter referred to as $Na_2H_2EDTA$ possesses the capability of chelating or tying up in the form of a water soluble metal complex of alkaline earth metal ions such as barium, calcium and/or strontium, which are usually present in aqueous systems in hard water areas.

It is also known that alkaline earth metal sulfate scale deposits can be dissolved and thus removed from tubular goods using $Na_2H_2EDTA$ to form water-soluble calcium, barium and strontium ionic complexes with $Na_2H_2EDTA$. However, one of the major problems associated with the use of such a material is its relatively high cost, which tends to reduce its economic usefulness.

It is accordingly an object of this invention to provide a method of removing alkaline earth metal scale deposits in gas and oil flow lines, auxiliary equipment, well tubing and the surrounding subsurface strata.

A further object is to provide a scale treating composition for use in removal of the built-up alkaline earth metal scale deposits in the well tubing, producing equipment, the bore hole and surrounding strata.

A still further object of this invention is to provide a method of and composition for the treatment of gas and oil well tubing and the like containing alkaline earth metal sulfate scale therein to remove the scale deposits in the tubing.

A further object is to provide a method of recovering the $Na_2H_2EDTA$ in an efficient and economic manner.

These as well as other objects are accomplished according to the present invention which comprises a new and improved method of removing alkaline earth metal sulfate scale deposits using $Na_2H_2EDTA$ and of recovering the $Na_2H_2EDTA$ for subsequent use.

Broadly, the method of the present invention comprises treating alkaline earth metal sulfate scale deposits with an aqueous alkaline solution of $Na_2H_2EDTA$ which is used at a concentration effective to dissolve at least some of the scale deposits by formation of a water-soluble metal complex with the $Na_2H_2EDTA$ reagent, settling and/or filtering, if necessary, the resulting solution to remove any suspended solid scale particles therefrom, acidifying, preferably with hydrochloric acid to a pH of about 3–4.2, preferably about 3.8, the resulting treating solution to effect precipitation of said dissolved alkaline earth metal sulfate scale and recovering the filtrate, further acidifying the recovered filtrate to precipitate the acid $H_4EDTA$, filtering the precipitated acid $H_4EDTA$, treating the precipitated acid $H_4EDTA$ with aqueous alkali in an amount sufficient to effect solubilization of the $H_4EDTA$ as $Na_2H_2EDTA$ in said aqueous alkaline solution for removal of an additional quantity of the alkaline earth metal sulfate scale deposits from the formation.

The above-described method of the present invention is highly suitable for removal of a barium scale and is satisfactory for the removal of some calcium scale but it is not as efficient for calcium as for barium since calcium sulfate is somewhat more soluble in water than barium sulfate particularly at pH values less than 7. By modifying the above method, its efficiency for removing calcium scale is enhanced to a degree comparable to that for barium.

The modification comprises acidification of the alkaline treating solution containing the dissolved scale in that complex form to a pH in the range of from about 7 to 8, that is, neutral or slightly alkaline. At this pH the solution is treated with an aqueous solution of an oxalate in the form of its ammonium or alkali metal salts. Oxalic acid can be used in the acidification step as part of the acid used to adjust the solution pH to the range of 7–8.

The acidification and the oxalate addition steps are preferably carried out on heated solutions (80°–210° F.) since the calcium oxalate formed under these conditions precipitates in a better crystalline form and is of a larger particle size which permits easier removal from the treating solution by settling and/or filtration. After removal of the calcium oxalate the remaining treating solution is treated as previously described for recovery of the $H_4EDTA$ and its subsequent conversion to the $Na_2H_2EDTA$ reagent.

In cases where the scale deposits are mixed calcium and barium sulfate scales, the procedure comprises the above-described calcium sulfate procedure up to and including removal of the calcium oxalate precipitate at the pH of 7–8. Some of the dissolved barium ions also precipitate as barium oxalate.

The remaining calcium ion denuded treating solution containing the remaining barium complex is further acidified with a mineral acid such as hydrochloric acid or sulfuric acid, preferably the latter, to a Ph of about 3.8 to precipitate barium in the form of its sulfate from the solution. The precipitated barium sulfate can be readily removed by settling and/or filtration. The remaining solution of filtrate is then subjected to the previously described $H_4EDTA$ recovery method and its conversion to the $Na_2H_2EDTA$ form.

When mixed alkaline earth metal sulfate scales such as mixed calcium, barium and strontium sulfates are encountered, the above-described method for barium and calcium is used. The dissolved strontium ion complexed with $Na_2H_2EDT$ A is partially removed at a pH of 7–8 with the calcium using oxalate in stoichiometric excess. The remaining portion of the strontium scale complex is removed with the barium as strontium sulfate admixed with the barium sulfate.

If strontium sulfate scale is encountered it is best removed by the procedure described for the removal of barium sulfate scale. If strontium sulfate in encountered with calcium sulfate, it is best removed by the procedure used for calcium sulfate. If both barium sulfate and strontium sulfate scales are to be removed, the procedure for barium sulfate scale is to be used.

In carrying out one aspect of the present invention the method thereof comprises introducing the scale treating composition into the equipment to be protected, such as oil well tubing, in the form of an aqueous alkaline solution having a pH of 10 or more, suitably 10–13, preferably 11–12, containing $Na_2H_2EDTA$ at a concentration of from about 1 to about 16 percent by weight, preferably 4–8 percent by weight and maintaining the scale treatment composition on internal surfaces thereof for a contact time sufficient to remove at least a portion of the scale deposits. It is desirable to circulate the scale treating composition through the system to provide adequate contact of the composition with the scale surfaces. Underground strata surrounding the well bore can be treated in a like manner, i.e., by passing the treating solution into said strata such as by injection of the solution down through the bore hole or production tubing, preferably under pressure.

In general, it has been found that excellent removal of scale deposits can be obtained by maintaining the treating composition in contact with the scale for a contacting time period of from about 0.2 to about 24 hours and preferably between about 0.5 to 2 hours. This contacting time period can also be advantageously used in areas containing relatively light deposits such as oil field tubing. In areas where heavy scale deposits are present, the contacting time period can be extended to 24 hours or more without any harmful effects.

The scale removal composition of the present invention is used in an amount sufficient to provide to the treating solution the $Na_2H_2EDTA$ compound in an amount of from 1 to 16 percent by weight. It has been found that excellent results are obtained with the $Na_2H_2EDTA$ compound at concentrations in the range of about 4 to 8 percent by weight.

The pH of the treating solution should be at least 10, preferably 11–13, to provide maximum solubilization of the scale deposits. Suitable alkalizing agents include the hydroxides of sodium and potassium.

It has also been found that by maintaining the treating solution at an elevated temperature one is able to increase the amount of scale deposits dissolved in the treating solution. Suitable solution temperatures for use in removing barium sulfate scale have been found to be from about 86° F. up to about 194° F., preferably from about 100° to 140° F. since at the higher temperatures 145°–194° F. the amount of the barium scale removed is less than that removed at temperatures between about 85°–140° F. due to decreased solubility of the scale.

The treating solution temperature also has an influence on the time of treatment. At high-solution temperatures, i.e., 150°–194° F. it has been found that the rate of scale removed is higher than at temperatures of about 100° F.

Circulation rates for the treating solution are dependent on the temperature of treatment, the type of scale, etc. One may also use a hot quiescent treating solution where the equipment to be descaled is adaptable to dismantling and insertion in a treating tank or vessel or is of such a size that permits it to be immersed in the tank without disassembly.

A more complete understanding of the invention will be obtained from the following illustrative example.

An aqueous treating solution containing disodium ethylenediaminetetraacetate dihydrate ($Na_2H_2EDTA$) in an amount of 667 pounds per 1,000 gallons of water is prepared, this solution being equivalent to 7.16 percent anhydrous $Na_2H_2EDTA$ or 7.41 percent as the dihydrate. The pH of the solution is adjusted with caustic to attain a pH of 12, and the solution is heated to a temperature of 120°–140° F. The heated solution is circulated through the tubular goods which have barium sulfate deposited thereon at a rate sufficient to provide about a 1 hour residence time for the solution in contact with the scale.

The treating solution, containing the barium scale products (dissolved and suspended) is passed through a sand filter to remove suspended matter, and then acidified with hydrochloric acid in an amount sufficient to lower the solution pH to about 3.8. On filtration, 68.7 pounds of barium sulfate is recovered as a filter cake. The filtrate is further acidified with additional hydrochloric acid to lower the pH to about 1. One filtration, 484.3 pounds of $H_4EDTA$ (equivalent to 617.0 pounds of $Na_2H_2EDTA$ dihydrate) is recovered as a filter cake. The $H_4EDTA$ filter cake is suspended in 200 gallons of water and treated with 10 percent caustic soda in the amount of 143.25 gallons to dissolve it and further diluted with water in the amount of 630.4 gallons of water to regenerate the original treating $Na_2H_2EDTA$ reagent. This reagent is brought to a pH of about 12 by additional caustic soda, thus reconstituting the treating solution. This treating solution is recirculated through the scale system again with essentially the same results.

The percentage recovery of the $H_4EDTA$ is 92.5 percent by weight, calculated as $Na_2H_2EDTA$ dihydrate.

I claim:

1. A method of removing a deposit of alkaline earth metal sulfate scale in an aqueous system which comprises contacting said scale deposit with a treating composition heated to a temperature in the range of from about 86° to about 194° F. consisting essentially of an aqueous alkaline solution containing from about 4 to about 8 percent by weight of disodium hydrogen ethylenediaminetetraacetate dihydrate and having a pH in the range of about 10 to 13 for a period sufficient to dissolve at least some of the said scale, acidifying said solution to decrease the pH thereof to a pH in the range of from 7 to 8 with an acid selected from the group consisting of sulfuric acid, hydrochloric acid, oxalic acid, a mixture of sulfuric acid and oxalic acid, and a mixture of hydrochloric acid and oxalic acid, to precipitate any alkaline earth metal ion present having an atomic weight below 80 as an insoluble salt, separating any formed precipitate, further acidifying the resulting treated solution to decrease the pH thereof to a pH in the range of from 3 to 4 with a mineral inorganic acid to precipitate any alkaline earth metal ion having a atomic weight above 80, as an insoluble salt, separating any formed precipitate, further acidifying the twice-acidified solution to decrease the pH thereof to a pH in the range of about 1 and to effect precipitation of the ethylenediaminetetraacetate ion in the acid form, treating the resulting last formed precipitate with aqueous caustic to dissolve the precipitate, adjusting the pH of the resulting solution to a pH in the range of 10–13, and reusing the thus adjusted solution to remove an additional quantity of alkaline earth metal sulfate scale deposit.

2. A method as claimed in claim 1 wherein the treating composition is maintained at a temperature of from about 100° to about 140° F.

3. A method as claimed in claim 1 wherein the scale is contacted with the treating composition for a period of from about 0.2 to about 4 hours.

* * * * *